May 15, 1934.                J. E. LEE ET AL                1,958,793
                           TYPE-HIGH MACHINE
                     Filed March 2, 1931      2 Sheets-Sheet 1

Inventors
James Edgar Lee
Freeman Barney
By Liverance and Van Antwerp
Attorneys

Inventors
James Edgar Lee
Freeman Barney
By Liverance and Van Antwerp
Attorneys

Patented May 15, 1934

1,958,793

UNITED STATES PATENT OFFICE 1,958,793

TYPE-HIGH MACHINE

James Edgar Lee and Freeman Barney, Grand Haven, Mich., assignors to The Challenge Machinery Company, Grand Haven, Mich., a corporation of Michigan Application March 2, 1931, Serial No. 519,407

8 Claims. (Cl. 90—19)

This invention relates to printers' routing machines and more particularly to such devices for holding the type or plate to be worked upon and means for accurately guiding the routing tool with respect thereto.

In printing establishments it is customary to operate upon a block of type or plate with a routing tool for the purpose of accurately leveling off the entire surface to a certain height or to remove metal from the surface of the type or plate in certain places. A suitable router used for this purpose is one having a base supporting a small electric motor, to the shaft of which the routing tool is attached, such a router being shown in the A. L. Salsbury Patent No. 1,611,-381. As above stated, it is desirable to work upon type either in the nature of set-up type or a unit casting which is so-called "type-high" and also upon a so-called plate which is of considerably less thickness than the type-high piece.

This invention provides means for supporting and clamping either a piece of type-high work or a plate in position to be worked upon by the router and also means for supporting the routing machine so that it may be moved in all directions over the work to perform its operation, said router supporting means being adaptable and readily changeable to support the router at proper height to operate either on the type-high work or upon the plate.

The invention provides various new and useful features of construction and arrangement in a device of this nature as hereinafter more fully described and particularly pointed out in the claims, reference being had to the accompanying drawings, in which, Fig. 1 is a plan view of a device embodying this invention.

Like numbers refer to like parts in all the figures.

Figure 1:
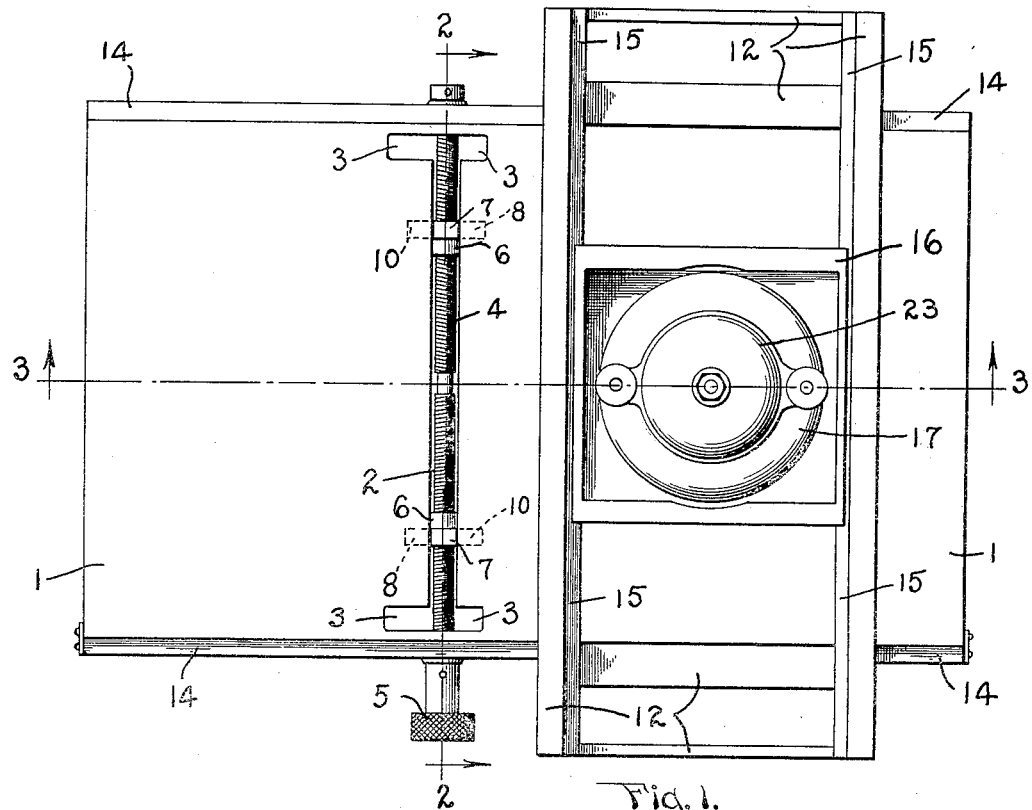
Figure 2:
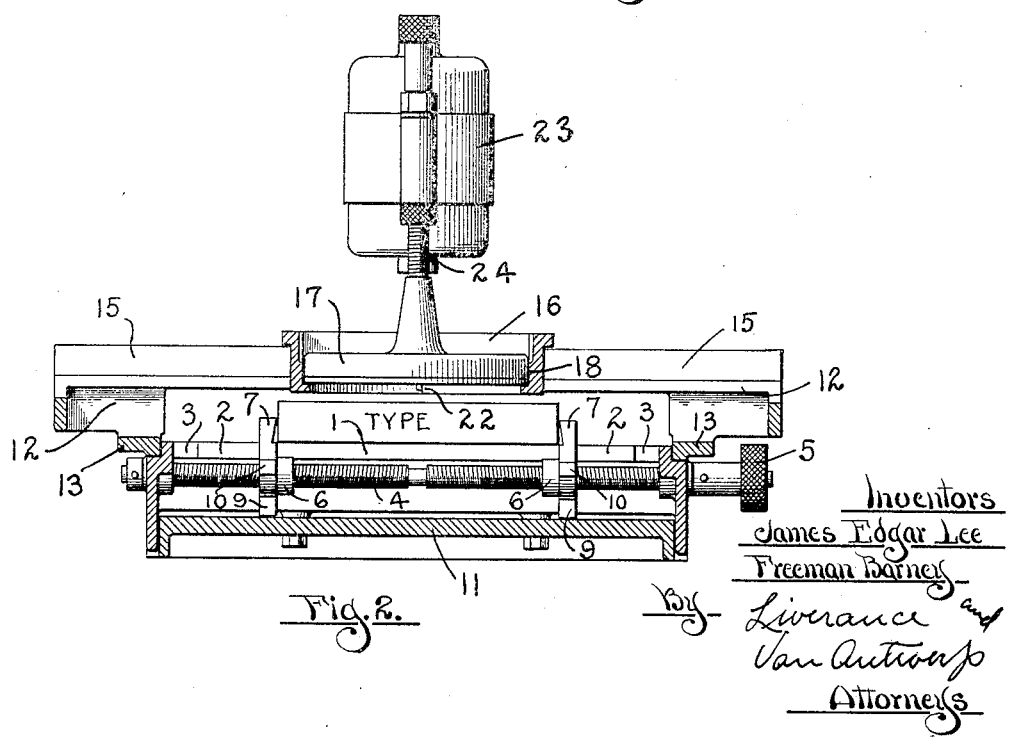
Fig. 2 is a transverse vertical sectional elevation of the same on the line 2—2 showing the router supporting bridge moved to position over the type clamping means.
Figure 3:
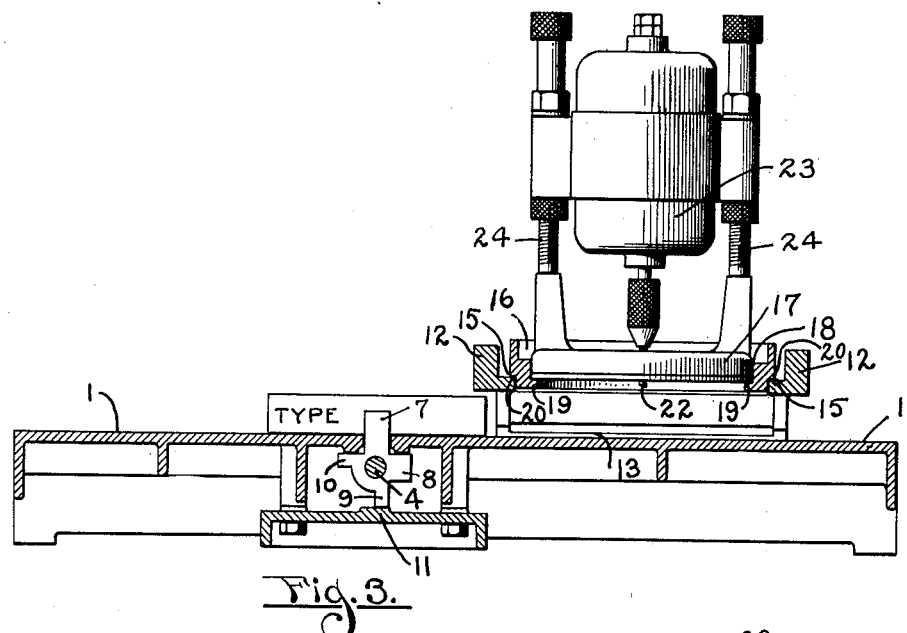
Fig. 3 is a longitudinal sectional elevation of the device as shown in Fig. 1, showing the router supported for type-high work.

The device comprises the base portion having a horizontal plane top surface 1 serving as a bed to support the work. A transverse slot 2 is provided in the upper surface of the bed, preferably nearer one end than the other, said slot extending substantially the entire width of the bed and having lateral extensions 3 at its respective ends near the sides of the bed. A shaft 4 is mounted for rotation in the base below and in alinement with the slot 2, being provided at one end outside of the base with a knob 5 for manual rotation. The shaft 4 is provided at respective opposite sides of its center with right and left hand screw threads.

Two clamp members 6, each having threaded openings, are located on said shaft, one at each side of the center thereof and are adapted to be moved by rotation of the shaft transversely of the table simultaneously in opposite directions by virtue of the right and left hand threads of the shaft. Each of the clamp members 6 has two jaws 7 and 8 extending laterally from the shaft at right angles to each other, the jaw 7 being longer than the jaw 8 and either of them being adapted to extend upwardly through the slot 2 of the bed and have its upper end project above the surface thereof. The length of the longer jaw 7 adapts it for clamping the thicker type-high work while the length of the shorter jaw 8 adapts it for clamping the thinner plate-high work.

Each of the clamp members 6 also has lateral extensions 9 and 10 diametrically opposite the jaws 7 and 8 respectively and when either of said jaws is extended through the slot 2 the opposite jaw and its corresponding lateral extension engage the underside of the bed to guide the clamp member in its movement and to hold it in its proper position. At the same time the lateral member opposite the extended jaw engages at its outer end a plate 11 extending transversely under the bed and supports the clamping member vertically and takes any downward thrust that may occur in its operation.

When the jaws are extended into the slot 2 they may be moved longitudinally of the slot by rotation of the screw threaded shaft 4 but cannot be rotated on the shaft but by moving the clamping members outwardly until they lie within the lateral extensions 3 of the slot they may be rotated so that either of the jaws 7 or 8 may extend upwardly and may be moved into the slot 2.

A supporting bridge 12 extends transversely over the bed 1 and has downwardly extending supports at its respective ends terminating in shoes 13 which are slidably mounted in guideways 14 at the respective longitudinal edges of the bed. The guideways are preferably in the nature of rabbeted grooves at the edges of the bed and the shoes 13 merely rest in said grooves and are longitudinally slidable therein. The under surface of the bridge 12, which extends over the bed 1, is spaced above the bed somewhat higher than the height of a type-high piece of work so that the bridge may move freely over the highest work which may be clamped upon the bed.

The central portion of the bridge 12 is open providing an opening extending transversely of the bed 1 substantially the full width thereof and at each side of said opening in the bridge is provided a guideway 15, which guideway extends longitudinally of the bridge and transversely of the bed. A supporting slide 16 is arranged to rest on and traverse the guideways 15. The base 17 of the routing machine is preferably round and a corresponding round socket 18 is provided in the slide 16 to receive said base. A flange 19 extends inwardly at the lower side of the slide on which the base rests when it is in place on the socket 18 and the lower portion of the slide is open within the flange 19.

Figure 4:
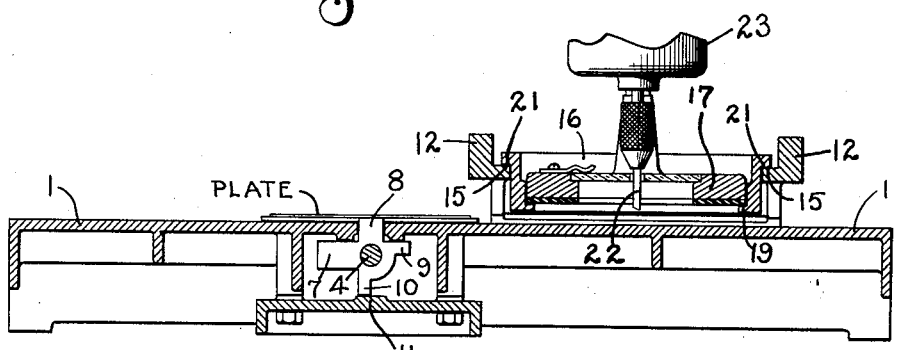
Fig. 4 is the same as Fig. 3 with upper parts broken away showing the router supported for plate-high work.
Figure 5:
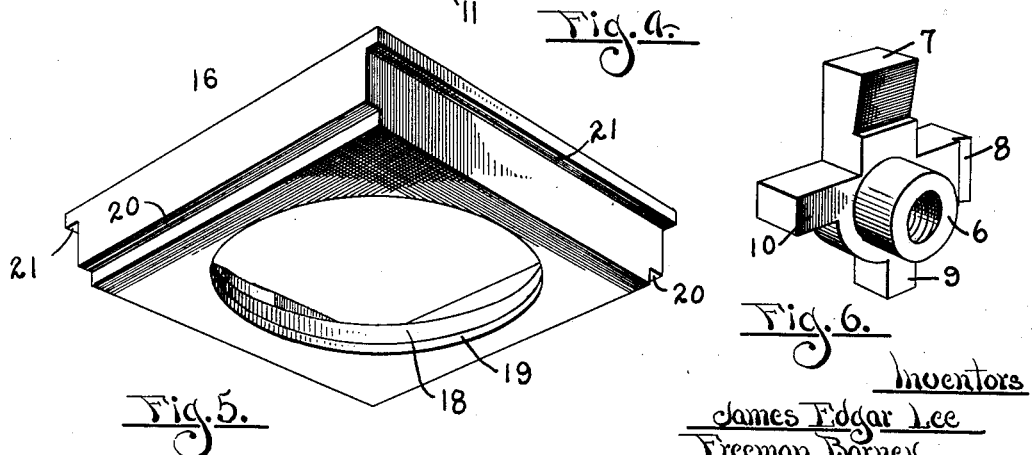
Fig. 5 is a perspective view of the underside of the router supporting slide.
Figure 6:
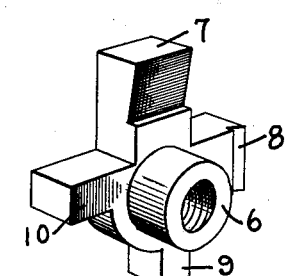
Fig. 6 is an enlarged perspective view of one of the work clamping jaws.

The base 17 has an opening extending downwardly therethrough, this opening being shouldered near its upper end and receiving the transparent member therein as clearly shown in Fig. 4. A small opening in the transparent member permits operation of a tool 22 therethrough.

The slide 16 is substantially square in plan view and has supporting shoulders 20 on two of its opposite vertical sides near the bottom of the slide and two other supporting shoulders 21 on its other two vertical sides, which shoulders 21 are located in a plane higher than the shoulders 20. Either pair of supporting shoulders 20 or 21 is adapted to engage the guideways 15 to traversely support the slide thereon. When the shoulders 20 are riding on the guideways 15 the slide and the router supported thereby are at the proper height above the bed to operate upon type-high work. When the slide 16 is turned 90° from the above position and the shoulders 21 ride upon the guideways 15 the slide and router are supported in a lower plane at the proper height above the bed to operate upon the plate-high work.

By the above described supporting means, the router is removably supported in the socket 18 of the slide 16 and is rotatable in said socket because of the round shape of the base and the corresponding round socket. The routing tool 22, which is mounted on the lower end of the shaft of the motor 23, extends through the opening within the flange 19 and the motor 23 is mounted for vertical adjustment on the screw threaded posts 24 which extend upwardly from the base 17 of the router. The slide and router may readily be supported on the guideways 15 of the bridge 12 in either of two horizontal planes by means of the two pairs of supporting shoulders 20 and 21 on the slide and the slide and router are readily movable on the bridge transversely of the bed 1 and the bridge is movable longitudinally of the bed whereby the routing tool has a universal movement in a horizontal plane over said bed and the work clamped thereon.

The fact that the clamping means on the bed, including the shaft 4 and the clamp members 6, are located at one side of the transverse center of the bed makes it possible to move the bridge with the router supported thereon to the opposite end of the bed clear of the clamping means for the purpose of locating type of work in the clamping means without necessitating removal of the bridge and router from the bed.

In operation the bridge with the slide and router supported thereon is moved to one end of the bed clear of the clamping means and the work is placed upon the bed between the clamping members 6. The proper jaws 7 or 8 of the clamping members are turned upwardly by moving the clamping members outwardly into the lateral extensions 3 of the slot 2 where they may be rotated and are then moved inwardly toward the work by rotation of the threaded shaft 4 until they engage opposite edges of the work and clamp it firmly in place. This clamping action is made rigid by engagement of the jaw beneath the bed and its corresponding extension 9 or 10 with the underside of the bed which prevents upward movement and also by engagement of the extension 9 or 10 opposite the clamping jaw with the plate 11 which supports the clamping member against downward movement.

With the work clamped in place the slide 16 is supported by the proper pair of shoulders 20 or 21 to the height corresponding to the work to be done. If the work is type-high the slide is supported by the shoulders 20 or if the work is plate-high the slide is supported in the lower position by the shoulders 21. When so supported the bridge is moved over the work by sliding the shoes 13 on the guideways 14 and the slides 16 may be moved transversely of the bed by sliding its shoulders 20 or 21 on the guideways 15. This provides a universal movement of the router in either of two horizontal planes over the work which may be either type-high or plate-high. Accurate adjustment of the height of the router tool in either of the planes is obtained by vertical adjustment of the router motor 23 relative to its base 17 on the supporting posts 24 so that the router tool may be adjusted to accurately trim the block to proper height or to cut below the surface of the type as desired, the router tool operating through the small opening in the transparent plate whereby the operator is shielded and protected thereby.

The invention is defined in the appended claims and is to be considered comprehensive of all forms of structure coming within their scope.

We claim:

1. A device of the class described comprising, a work supporting bed, a bridge mounted for movement over said bed, a tool carrying member having two supporting shoulders in different horizontal planes, either of said supporting shoulders being engageable with said bridge to support the tool carrying member thereon in either of two predetermined horizontal planes, a tool and means for mounting said tool on said tool carrying member for vertical adjustment relative thereto.

2. A device of the class described comprising, a work supporting bed, a bridge mounted for movement above said bed and longitudinally thereof, spaced apart guideways on said bridge extending transversely of said bed, a tool carrying slide having two sets of shoulders in different horizontal planes, either of said sets of shoulders being traversably engageable with said guideways whereby said slide may be transversely mounted on said bridge in either of two horizontal planes.

3. A device of the class described comprising, a work supporting bed, a bridge mounted for movement over said bed and longitudinally thereof, spaced apart guideways on said bridge extending transversely of said bed, a quadrilateral slide, a pair of supporting shoulders, one on each of two opposite sides of said slide in one horizontal plane, a second pair of supporting shoulders one on each of two other opposite sides of said slide and in a different horizontal plane than said first pair, either of said pairs of supporting shoulders being traversably engageable with said guideways, and means for mounting a tool on said slide.

4. A device of the character described comprising, a work supporting bed, an element thereabove, spaced apart guideways on said element, a tool carrying slide having two sets of shoulders in different horizontal planes, either of said sets of shoulders being traversably engageable with said guideways whereby said slide may be mounted on said bridge in either of two horizontal planes.

5. A device of the class described comprising, a supporting member having a socket therein, a flange extending inwardly from said socket, and a tool carrying member having a circular base, said base resting upon said flange whereby it is revolubly mounted in said socket.

6. In a router of the class described, a base, a motor mounted thereon, said base having a relatively large opening therethrough, a tool, driven by said motor, extending through said opening and transparent protecting means, having a small hole through which the said tool extends, and means for mounting said transparent means over the said relatively large opening for the purpose described.

7. In a device of the character described, a support having a seat therein, a tool carrying member mounted on said seat whereby it may rotate, said member being of relatively heavy weight and a tool revolubly driven by said tool carrying member, the axes of rotation of the tool and tool carrying member being coincident.

8. In combination, a supporting member having two spaced parallel guideways, and a tool carrying member having two sets of ways, either set of ways being adapted for engagement with the said guideways for the purpose described.

JAMES EDGAR LEE.
FREEMAN BARNEY.